United States Patent [19]

Akashi et al.

[11] Patent Number: 5,670,083
[45] Date of Patent: Sep. 23, 1997

[54] OPTICAL ELEMENT AND PROCESS FOR PRODUCING THE SAME

[75] Inventors: Ryojiro Akashi; Masanobu Ninomiya; Takashi Uematsu; Takashi Morikawa, all of Minami-ashigara, Japan

[73] Assignee: Fuji Xerox Co., Ltd., Tokyo, Japan

[21] Appl. No.: 391,179

[22] Filed: Feb. 21, 1995

[30] Foreign Application Priority Data

| Feb. 23, 1994 | [JP] | Japan | 6-048003 |
| Mar. 18, 1994 | [JP] | Japan | 6-072947 |
| Mar. 18, 1994 | [JP] | Japan | 6-072948 |
| Mar. 18, 1994 | [JP] | Japan | 6-072949 |
| Oct. 20, 1994 | [JP] | Japan | 6-279816 |

[51] Int. Cl.$^6$ ............ C09K 19/52; G02F 1/13
[52] U.S. Cl. ............ 252/299.01; 359/93
[58] Field of Search ............ 252/299.01; 359/93

[56] References Cited

U.S. PATENT DOCUMENTS

| 5,023,013 | 6/1991 | Yamazaki et al. | 252/299.67 |
| 5,278,243 | 1/1994 | Soane | 525/288 |
| 5,309,264 | 5/1994 | Lien et al. | 359/87 |
| 5,447,662 | 9/1995 | Herr et al. | 252/582 |
| 5,479,282 | 12/1995 | Toko et al. | 359/75 |

FOREIGN PATENT DOCUMENTS

| 0 141 512 | 5/1985 | European Pat. Off. . |
| 0 205 261 | 12/1986 | European Pat. Off. . |
| 0 293 911 | 12/1988 | European Pat. Off. . |
| 0 314 473 | 5/1989 | European Pat. Off. . |
| 0 555 021 A1 | 8/1993 | European Pat. Off. . |
| 59-10930 | 1/1984 | Japan . |
| 62-14114 | 1/1987 | Japan . |
| 63-223060 | 9/1988 | Japan . |
| 2-2513 | 1/1990 | Japan . |
| 2-57396 | 2/1990 | Japan . |
| 2-42415 | 2/1990 | Japan . |
| 4-218024 | 8/1992 | Japan . |
| 6-18866 | 1/1994 | Japan . |

OTHER PUBLICATIONS

"Investigations on Liquid Crystalline Polysiloxanes 3$^{a)}$, Liquid Crystalline Elastomers —A New Type of Liquid Crystalline Material$^{b)}$", Makromol. Chem., Rapid Commun., Heino Finkelmann et al., 1981, vol. 2, p. 317.

"Liquid Crystalline Elastomers", Angew. Chem. Adv. Mater., R. Zentel, 1989, vol. 101, pp. 1437–1444.

(List continued on next page.)

Primary Examiner—C. H. Kelly
Attorney, Agent, or Firm—Oliff & Berridge

[57] ABSTRACT

An optical element comprising a polymer liquid crystal composition having an optically anisotropic multi-domain structure which is formed by crosslinking a composition containing a polymer liquid crystal. Since the multi-domain structure is stabilized by crosslinking, the element exhibits excellent reproducibility in restoring white turbidity.

21 Claims, 2 Drawing Sheets

OTHER PUBLICATIONS

"Liquid crystalline elastomers based on liquid crystalline side group, main chain and combined polymers[a)]", *Makromol. Chem.*, R. Zentel et al., 1986, vol. 187, pp. 1915–1926.

"Model Considerations and Examples of Enantiotropic Liquid Crystalline Polymers", *Makromol. Chem.*, Heino Finkelmann et al., 1978, vol. 179, pp. 273–276.

"Thermotropic Liquid–Crystalline Polymers–VI*", *Eur. Polym. J.*, Valery P. Shibaev et al., 1982, vol. 18, pp. 651–659.

"Application of Side Chain Type Liquid Crystal Polymer for Display and Recording Devices", *Mol. Cryst. Liq. Cryst.*, T. Nakamura et al., 1989, vol. 169, pp. 167–192.

"Stress–induced orientation in lightly crosslinked liquid--crystalline side-group polymers", *Makromol. Chem.*, R. Zental et al., 1987, vol. 188, pp. 665–674.

"Thermo–Optical Effect in Polymeric Liquid Crystal for Display Applications", *Japan Display*, T. Ueno et al., 1986, pp. 290–292.

"Thermotropic liquid–crystalline polymers: 14*. Thermo–recording on liquid–crystalline polymers with the aid of a laser beam.", *Polymer Communications*, V.P. Shibaav et al., 1983, vol. 24, pp. 364–365.

A.M. Lackner et al., "Droplet Size Control in Polymer Liquid Crystal Films," Jan. 17–18, 1989, vol. 1080, ISSN 0277–786K, Liquid Crystal Chemistry, Physics and Applications, Los Angeles, CA, Proceedings of the SPIE —The International Society for Optical Engineering.

Patent Abstracts of Japan, vol. 017, No. 481 (P–1604), Aug. 31, 1993 and JP–A–05 119301 (Sharp Corp.), May 18, 1993.

Patent Abstracts of Japan, vol. 015,No. 331 (P–1241), Aug. 22, 1991, and JP–A–03–122623 (Canon, Inc.), May 24, 1991.

OPTICAL ELEMENT AND PROCESS FOR PRODUCING THE SAME

FIELD OF THE INVENTION

This invention relates to a novel optical element comprising a polymer liquid crystal composition, a process for producing the optical element. The optical element is capable of repeatedly recording and erasing information.

BACKGROUND OF THE INVENTION

Polymer liquid crystals have been studied for their applicability as novel functional material to recording media and display media. For example, application to recording media is disclosed in JP-A-59-10930 (the term "JP-A" as used herein means an "unexamined published Japanese patent application") and JP-A-63-223060, and application to display media is disclosed in JP-A-62-14114, JP-A-2-2513, *Polym. Commun.*, Vol. 24, p. 364 (1983), and *Japan Display*, p. 290 (1986).

In particular, a reversible recording medium using a polymer liquid crystal whose light scattering properties can be changed reversibly by application of heat with a thermal head or by a laser beam so as to record or erase information repeatedly was proposed as disclosed in JP-A-2-57396 and JP-A-6-18866, and it has been expected to put it to practical use.

Techniques for crosslinking polymer liquid crystals are disclosed in *Macromol. Chem. Rapid Commun.*, Vol. 2, p. 317 (1981), *Macromol. Chem.*, Vol. 188, p. 665 (1987), *Angew. Chem. Adv. Mater.*, Vol. 101, p. 1437 (1989), and *Makromol. Chem.*, Vol. 187, p. 1915 (1989). Crosslinked polymer liquid crystals are expected to be applicable as elastomers, novel light modulation elements or display elements. Further, a display device resistant against damage due to contact with a thermal head is disclosed in JP-A-2-42415, in which a polymer liquid crystal having a liquid crystal moiety in the main chain thereof is crosslinked.

The present inventors previously proposed a light conversion element comprising a side chain type polymer liquid crystal having a liquid crystal compound and a non-liquid crystal compound as side chain components (see JP-A-4-218024) and a reversible display medium having a polymer liquid crystal layer comprising a side chain type polymer liquid crystal (see JP-A-6-18866).

Among these conventional optical elements or media using polymer liquid crystals, those utilizing heat for recording/display/erasure have poor reproduction of optical characteristics due to unevenness of temperature or cooling rate. In an optical element which utilizes light scattering for displaying or recording, in particular, since the light scattering, i.e., the whiteness greatly depends on the cooling rate after heating, accurate control of cooling rate is demanded in order to obtain uniform light scattering properties, and unevenness of light scattering properties still occurs in elements having a large display area. Further, the element of this type has a low speed of recording or erasure, taking time for recording or erasure. In using a thermal head, either one of recording and erasure cannot be conducted at a high speed.

In addition, since polymer liquid crystals have broad molecular weight distribution showing a Gauss distribution similarly to general-purpose polymers, they are inferior to low-molecular weight liquid crystals for use as functional material in part of their physical properties and various performance characteristics. For example, the change by phase transition of polymer liquid crystals is broad as compared with the steep change observed with low-molecular weight liquid crystals. This results in such problems as low display contrast when the polymer liquid crystal is used as a recording medium. That is, the broad change from liquid crystal phase to isotropic phase or vice versa at the phase transition temperature for recording leads to reductions in recording sensitivity and recording speed. Additionally, the broadness of molecular weight distribution means broadness of the glass transition point which influences preservability of recorded information, resulting in a reduction of record preserving temperature.

SUMMARY OF THE INVENTION

An object of the present invention is to solve the above-mentioned problems associated with conventional technique using polymer liquid crystals as an optical element material.

An object of the present invention is to provide an optical element exhibiting excellent light scattering properties, greatly improved reproducibility of recording/erasure performance, increased speed in recording/erasure, and improved optical characteristics and an optical recording device utilizing the optical element.

Another object of the present invention is to provide a process for producing an optical element comprising a light scattering composition essentially comprising a polymer liquid crystal, by which process great improvements on display characteristics, optical characteristics such as light controlling characteristics, reproducibility of recording/erasure performance, and display uniformity can be obtained.

Optical elements utilizing polymer liquid crystals, such as display elements and recording media, have been studied for their practical applicability because they are capable of repeatedly displaying/recording and erasing information and preserving the record. However, an optical element having both an area incapable of repetition of recording/erasure (an unerasable image) and an area capable of repetition of recording/erasure (an erasable image) is unknown.

Accordingly, a further object of the present invention is to provide a method for forming an unerasable image on an optical element comprising a light scattering composition essentially comprising a polymer liquid crystals.

A still further object of the present invention is to provide an optical element prepared by the method which has both an erasable image and an unerasable image.

A yet further object of the present invention is to provide a recording medium comprising a polymer liquid crystal having a specific molecular weight distribution and thereby having excellent sensitivity, excellent display contract, and improved record preservability.

In this way, the present invention includes the following embodiments (i) to (v).

(i) The optical element according to the present invention comprises a polymer liquid crystal composition having an optically anisotropic multi-domain structure which is formed by crosslinking a composition containing a polymer liquid crystal.

The optical element using the above-mentioned optical element comprises a substrate having thereon the crosslinked polymer liquid crystal composition (hereinafter referred to as a polymer liquid crystal layer) having an optically anisotropic multi-domain structure which is formed by crosslinking a composition containing a polymer liquid crystal, and a protective layer thereon.

(ii) Another optical element according to the present invention comprises a crosslinked composition containing a polymer liquid crystal comprising a copolymer containing a mesogen monomer unit and a non-mesogen monomer unit, in which a liquid crystal component and a non-liquid crystal component are separated in independent phases to form a multi-domain structure as a whole.

(iii) The optical element and the process for producing the same, which comprises subjecting a polymer liquid crystal composition to heat treatment to control a multi-domain structure and crosslinking the composition while retaining the multi-domain structure. The process is characterized in that a light scattering composition essentially comprising a polymer liquid crystal is heat treated so as to have a multi-domain structure (internal microstructure) having a desired domain size distribution and the composition is then crosslinked while maintaining the multi-domain structure.

(iv) Still another optical element and the image formation method comprises a polymer liquid crystal composition having previously formed thereon an unerasable image showing no light scattering properties by forming an image having no light scattering properties on at least a part of the element and then crosslinking the composition to make the image having no light scattering properties unerasable.

(v) The optical element according to the present invention comprises a polymer liquid crystal composition containing a polymer liquid crystal having a weight average molecular weight to number average molecular weight ratio (Mw/Mn) of not more than 4.0.

Another optical element according to the present invention comprises a substrate having thereon a recording layer in which the recording layer is formed by molding a polymer liquid crystal having a weight average molecular weight to number average molecular weight ratio (Mw/Mn) of not more than 4.0 and then crosslinking the polymer liquid crystal.

The polymer liquid crystal used in the above recording media is preferably a copolymer of a mesogen monomer and a non-mesogen monomer.

DETAILED DESCRIPTION OF THE INVENTION

Figure 1:
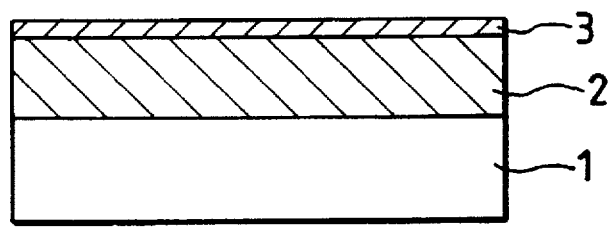
FIGS. 1 through 4 are each a schematic cross section of an optical element.

The terminology "optically anisotropic multi-domain structure" as used herein denotes a structure formed of a composition containing a polymer liquid crystal, the structure being made of a plurality of domains showing optical anisotropy such as birefringence. Formation of such domains is attributed to difference in orientation of liquid crystal molecules in the inside of a polymer liquid crystal composition. That is, liquid crystal molecules in a single domain are oriented substantially in one direction. Molecular orientation in a domain produces optical anisotropy of the domain, making the domain optically distinguishable from others. A "multi-domain structure" is an agglomerate of a plurality of domains showing such optical anisotropy. It is preferable that the directionality of the optical anisotropy of each domain (the direction of molecular orientation) is at random.

The "light scattering composition comprising a polymer liquid crystal" used in the present invention forms the above-mentioned multi-domain structure in a temperature range showing a liquid crystal phase.

The polymer liquid crystals which can be used in the present invention are first described. Known polymer liquid crystals include main chain type polymer liquid crystals having a mesogen (a molecule exhibiting liquid crystal properties) on their main chain and side chain type polymer liquid crystals having a meson on their side chain. Side chain type polymer liquid crystals are preferred in the present invention. Polymer liquid crystals having a reactive group as one component of their main chain or side chain are also preferred. Suitable reactive groups include polymerizable groups, such as a vinyl group, an acrylate group, and a methacrylate group; heterocyclic groups, such as an epoxy group; an isocyanate group, a hydroxyl group, an amino group, an acid amido group, a thiol group, a carboxyl group, a sulfo group, a phospho group, a metal alcoholate group, and a magnesium halide (Grignard reagent) group.

The polymer liquid crystals, particularly side chain type ones can usually be prepared by polymerization of a polymerizable mesogen compound or addition of a mesogen compound to a reactive polymer such as a hydrogenated silicone polymer. The relevant techniques are described in *Makromol. Chem.*, 179, 273 (1978), *Eur. Polym. J.*, 18, 651 (1982), and *Mol. Cryst. Liq. Cryst.*, 169, 167 (1989). The polymer liquid crystals which can be used in the present invention can be prepared in accordance with the disclosed techniques, for example, by copolymerizing a polymerizable mesogen compound (mesogen monomer) and a polymerizable compound having a reactive group (reactive monomer) or by adding to a reactive polymer an addition reactive mesogen compound and an addition reactive non-mesogen compound having a reactive group. The polymerizable mesogen compound and the addition reactive mesogen compound typically include compounds having a rigid molecule called a mesogen, such as a biphenyl skeleton, a phenyl benzoate skeleton, a cyclohexylbenzene skeleton, an azoxybenzene skeleton, an azobenzene skeleton, an azomethine skeleton, a phenylpyrimidine skeleton, a diphenylacetylene skeleton, a biphenyl benzoate skeleton, a cyclohexylbiphenyl skeleton or a terphenyl skeleton, to which a reactive group, such as an acrylic ester group, a methacrylic ester group or a vinyl group, is bonded via an alkyl group spacer of prescribed length.

Typical structures of the polymerizable mesogen compounds or repeating units are represented by formulae (I) to (IV):

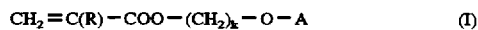    (I)

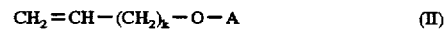    (II)

    (III)

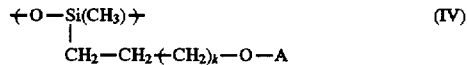    (IV)

wherein R represents a hydrogen atom or a methyl group; k represents an integer of from 1 to 30; and A represents a mesogen selected from structures (a) to (k):

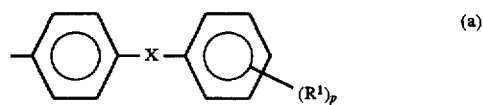    (a)

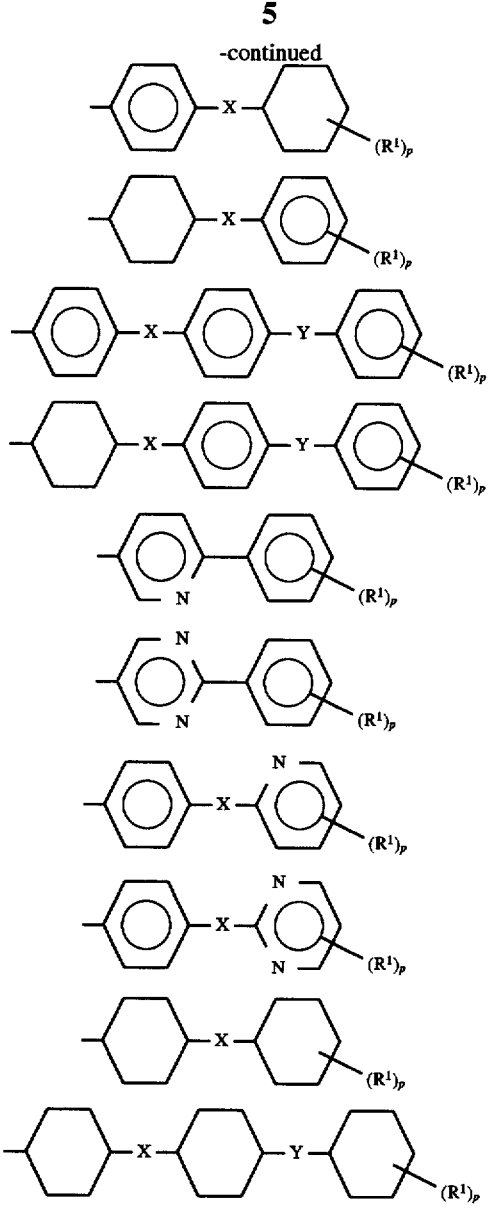

wherein X and Y each represent a single bond, —N=N—, —N(→O)=N—, —CH=N—, —N=CH—, —COO—, —O(C=O)— or an ethynylene group; p represents an integer of from 1 to 5; $R^1$ represents an alkoxy group, a halogen atom, a cyano group, a carboxyl group or an alkyl group; when p is 2 or more, the plural $R^1$ groups may be the same or different.

The polymer liquid crystal may be crosslinked taking advantage of its reactive group, if desired, in the presence of a catalyst and/or a polyfunctional reactive compound. Suitable reactive groups include addition reactive or polymerizable groups, such as a vinyl group, an acrylate group, a methacrylate group, a heterocyclic groups, such as an epoxy group, and an isocyanate group; a hydroxyl group, an amino group, an acid amido group, a thiol group, a carboxyl group, a sulfo group, a phospho group, a metal alcoholate group, and a magnesium halide (Grignard reagent) group. Catalysts which may be used if desired include various kinds of ultraviolet polymerization initiators and thermal polymerization initiators. Suitable polyfunctional reactive compounds include polyfunctional isocyanate compounds, polyfunctional epoxy compounds, polyfunctional melamine compounds, polyfunctional aldehyde compounds, polyfunctional amine compounds, and polyfunctional carboxyl compounds.

The above-mentioned mesogen compounds may further contain a reactive group other than the double bond-containing groups.

Examples of the polymerizable compounds having a reactive group (reactive monomers) which are to be copolymerized with the aforesaid mesogen compounds include (meth)acrylic acid, ω-carboxy-polycaprolactone-mono(meth)acrylate, vinyl sulfonate, hydroxyethyl (meth)acrylate, hydroxypropyl(meth)acrylate, 2-(meth)acryloxyethyl acid phosphate, 2-hydroxy-3-phenoxypropyl (meth)acrylate, 2-(meth)acryloxyethyl succinate, mono(meth)acrylate phthalate, 2-(meth)acryloxyethyl(2-hydroxyethyl) phthalate, 4-(meth)acryloxyalkyloxybenzoic acid, glyceryl(meth)acrylate, hydroxy-substituted styrene, (meth)acrylamide, N,N-dimethylaminoethyl(meth)acrylate, N,N-diethylaminoethyl)(meth)arcylate, glycidyl(meth)acrylate, 2-propen-1-ol, and 5-hexen-1-ol. After the above-enumerated compound is once copolymerized or co-added, the reactive group may be replaced with a different reactive group. For example, a mesogen monomer is first copolymerized with hydroxyethyl(meth)acrylate to introduce a hydroxyl group and then (meth)acrylic acid, etc. is added to the hydroxyl group thereby introducing a polymerizable group to the polymer side chain. It is also possible to use various polymerizable or addition reactive mesogen compound having the above-described reactive group. For example, mesogen compounds having the above-illustrated structure in which $R^1$ is a hydroxyl group, a carboxyl group or an amino group may be used. These compounds are illustrative examples and are not construed to limit the present invention.

Where a side chain type polymer liquid crystal is prepared by copolymerizing a vinyl monomer having a liquid crystal molecule (mesogen molecule) as a substituent and a general vinyl monomer, the liquid crystal component to non-liquid crystal component ratio in the resulting copolymer can be controlled. Further, a crosslinking component can easily be introduced to this type of a copolymer by previously introducing the crosslinking component to the general vinyl monomer. This is characterized, especially, in the embodiment (ii).

Where the proportion of a liquid crystal component in a side chain type polymer liquid crystal is increased by the above-described control of a liquid crystal component to non-liquid crystal component ratio, a number of domains of the liquid crystal component can be formed in the polymer liquid crystal. In this case, retention of the polymer matrix comprising the non-liquid crystal component can be improved by crosslinking of the non-liquid crystal component. As a result, fluidity of the polymer matrix other than the liquid crystal component is restricted to provide a rigid structure exhibiting improved thermally controlled contrast between transparency and opaqueness. This is characterized, especially, in the embodiment (i).

In addition to the above-mentioned mesogen compound and the compound having a reactive group, the polymer liquid crystals may comprise various non-mesogen compounds having no reactive group incorporated as a third component by copolymerization or addition. Suitable compounds usable as the third component include alkyl (meth)acrylate and derivatives thereof, styrene and derivatives thereof, (meth)acrylonitrile, vinyl chloride, vinylidene chloride, vinylpyrrolidone, vinyl acetate, 1-hexene, and 1-octene. These compounds are used for preference because of their effectiveness in controlling a multi-domain structure or thermal characteristics. The proportion of the third component in the polymer liquid crystal ranges from 0.01 to 20% by weight.

The proportion of the copolymerized or added non-mesogen compound in the polymer liquid crystal preferably ranges from 0.1 to 80 mol %, more preferably 0.1 to 50 mol % and most preferably 1 to 40 mol %, in terms of monomer unit. The proportion of the non-mesogen compound having a reactive group in the total non-mesogen compounds preferably ranges from 1 to 100 mol %. The form of copolymerization or co-addition may be any of known forms, such as a random form, a block form or a graft form. The polymer liquid crystals have a weight average molecular weight of 1000 to 1,000,000, preferably 10,000 to 500,000.

The above-enumerated mesogen compounds and non-mesogen compounds may each be used either individually or as a combination of two or more thereof.

Two or more kinds of liquid crystal monomer may be used to improve properties of optical element. For instance, a mixture of liquid crystal monomer having methacrylic acid group and acrylic acid group as a polymerizable group improves heat-stability and durability and provides higher glass transition point.

The polymer liquid crystal of the present invention is prepared by homo- or copolymerization reaction of the above-described monomers or reactive compounds through radical polymerization or ionic polymerization or by addition reaction of the above-described monomers or reactive compounds to a reactive polymer. In one embodiment of the present invention, a weight average molecular weight to number average molecular weight ratio (Mw/Mn) of the polymer liquid crystal is controlled so as not to exceed 4.0, preferably not to exceed 3.0, still preferably not to exceed 2.0. The polymer liquid crystal having such a narrow molecular weight distribution exhibits excellent physical properties and characteristics.

In this embodiment, a molecular weight distribution of polymer liquid crystals is expressed in terms of a weight average molecular weight to number average molecular weight ratio, Mw/Mn. The polymer liquid crystals having such a narrow molecular weight distribution can be prepared by various methods. For example, a solution of a polymer liquid crystal having a relatively broad molecular weight distribution which is obtained by the above-described process of the present invention is poured into a mixed solvent of a good solvent and a poor solvent for the polymer liquid crystal at a varied mixing ratio to extract a component having a specific molecular weight distribution. A polymer liquid crystal having a narrow molecular weight distribution can also be obtained by synthesizing the polymer by living polymerization. In the former extraction method using a mixed solvent, suitable good solvents for the polymer liquid crystal include aromatic solvents, halogen-containing solvents, ketone solvents, and ether solvents, and suitable poor solvents for the polymer liquid crystal include alcohols, water, and aliphatic solvents. In the latter living polymerization method, living anionic polymerization, living cationic polymerization or living radical polymerization using metallic sodium, metallic lithium or a compound thereof as a polymerization initiator is suitable. The details of these techniques are described in Ohtsu, *KOBUNSHIGOSEI NO JIKKENHO.*, 209, Kagaku Dojin, *Macromolecules*, 25, 5554 (1992), ibid, 26, 2987 (1993), and ibid, 26, 5316 (1993).

The optical element according to the present invention comprises a polymer liquid crystal composition having an optically anisotropic multi-domain structure which is formed by crosslinking a polymer liquid crystal composition. It is preferable that the direction of the optical anisotropy of each domain (the direction of molecular orientation) is at random.

The polymer liquid crystal composition which can be used in the present invention is a composition containing at least the above-mentioned polymer liquid crystals and having light scattering properties. The light scattering composition preferably has a multi-domain structure. The terminology "multi-domain structure" as used herein means a structure in which a plurality of fine domains are agglomerated or dispersed like islands. The domain density in unit volume widely ranges. It is preferable that the domains comprise agglomerates of liquid crystal molecules (mesogen) on the side chain of a polymer liquid crystal and have the molecules oriented in one direction to exhibit optical anisotropy. The direction of the optical anisotropy of each domain (the direction of molecular orientation) is preferably at random.

Where the domain diameter in the multi-domain structure is about the wavelength of visible light, the domains strongly scatter visible light to make the polymer liquid crystal composition highly white turbid. Accordingly, a preferred domain size is such that the domain diameter at the maximum in the frequency distribution of domain diameter is not greater than 3 μm, preferably 0.2 to 1.5 μm, still preferably 100 to 600 nm. The difference between the maximum domain diameter and the minimum domain diameter in domain diameter distribution is preferably not more than 5 μm, still preferably not more than 3 μm, yet preferably about 1 μm. In other words, the domains are preferably uniform in size. When the domains have the above-mentioned preferred domain size and size distribution, they scatter visible light most strongly, i.e., exhibit strongest light scattering properties and thereby greatly improved optical characteristics. The domain size and size distribution can be controlled by adjusting the composition of the polymer liquid crystal or the composition of the polymer liquid crystal composition.

In the polymer liquid crystal composition, the size or density of the domains can be varied by changing the external temperature before crosslinking. That is, the multi-domain structure of the polymer liquid crystal composition can be adjusted in size as desired by subjecting the composition to heat treatment so as to provide a layer with increased light scattering properties.

After polymerization, small regions (about 0.1 μm) in which liquid crystal molecules are agglomerated, i.e., domains are present in the polymer matrix. These small regions can be grown to form a multi-domain structure as described above by subjecting the polymer to annealing by heating. By the heat annealing, the small domains grow to liquid crystal domains of about 0.2 to 1 μm. With no outer force, e.g., an electrical field, applied at the time of annealing, the liquid crystal molecules in each domain are oriented in one direction, but the plural domains show difference from each other in direction of the molecular orientation. This is characterized, especially, in the embodiment (iii).

The multi-domain structure of the present invention can be formed by a method comprising first forming a specific multi-domain structure and then crosslinking the polymer while retaining the multi-domain structure or a method comprising forming such a multi-domain structure in the course of crosslinking.

Preparation of the optical element according to the present invention will be explained. Crosslinking of the polymer liquid crystal composition can be effected by applying heat, light, an electron beam, etc. to a polymer liquid crystal prepared by the above-described method preferably in the presence of a catalyst and/or a polyfunctional reactive compound. Catalysts include various kinds of ultraviolet polymerization initiators and thermal polymerization initiators. Suitable polyfunctional reactive compounds include polyfunctional isocyanate compounds, polyfunctional epoxy compounds, polyfunctional melamine compounds, polyfunctional aldehyde compounds, polyfunctional amine compounds, and polyfunctional carboxyl compounds. Specific examples of the catalyst include azo type polymerization initiators, e.g., azobisisobutyronitrile (ABIN); peroxide type polymerization initiators, e.g., benzoyl peroxide; and ultraviolet polymerization initiators, e.g., phenyl ketone. Specific examples of the polyfunctional reactive compounds are tolylene diisocyanate (TDI), 4,4'-diphenylmethane diisocyanate, 3,4-dichlorophenyl diisocyanate, polymethylenepolyphenyl isocyanate, hexamethylene diisocyanate (HDI), an adduct of TDI or HID and a polyol, e.g., trimethylolpropane, bisphenol A diglycidyl ether, melamine, ethylenediamine, hexamethylenediamine, phenylenediamine, glutaraldehyde, terephthalaldehyde, oxalic acid, succinic acid, glutaric acid, maleic acid, terephthalic acid, pyromellitic acid, and pyromellitic anhydride.

The catalyst and/or polyfunctional reactive compound is preferably added in an amount of from 0.01 to 20% by weight based on the polymer liquid crystal.

For improving characteristics, the polymer liquid crystal composition of the present invention may further contain various other components. For example, various antioxidants, such as hindered amine or hindered phenol, may be added for improvement in weather resistance. Various dichroic dyes, such as anthraquinone dyes, styryl dyes, azomethine dyes or azo dyes, may be added for improvement in display contrast. Various fluorescent dyes may be added for improvement in light scattering properties. In order to efficiently conduct thermal recording using a laser beam, it is preferable to add various laser light absorbing dyes. For example, in using an ordinary semiconductor laser having a wavelength of 780 to 830 nm, near infrared absorbing dyes, such as phthalocyanine, squarylium or azulenium compounds, are usable. The amount of these optional components are within a range of from 0.01 to 5% by weight based on the polymer liquid crystal composition. The polymer liquid crystal composition may further contain 1 to 20% by weight of a low-molecular weight liquid crystal compound.

Crosslinking of the polymer liquid crystal composition is preferably conducted after it is formed into a desired element shape, such as a film, a block, a fiber, etc., as a molten mixture or as dissolved in a solvent and, if desired, after an image showing no light scattering properties is formed in part of the element as hereinafter described. The resulting crosslinked polymer liquid crystal has self-retaining properties by itself and is applicable as an optical element either as molded or, in a preferred embodiment, as supported on a substrate or inserted between a pair of substrates. Usable substrates include films of plastics, such as polyethylene terephthalate (PET), polyvinyl chloride, polypropylene or polyimide, paper, metals, ceramics, and glass. A transparent substrate is particularly preferred in application as a transmission type display. A substrate with an electrode is also preferred.

The heat treatment is preferably carried out by heating to a prescribed temperature followed by cooling at a controlled cooling rate or by annealing at a prescribed temperature. Annealing is conducted most effectively at such a temperature at which the main chain movement of the polymer liquid crystal is allowed and also the composition exhibits a liquid crystal phase in which light scattering properties can be confirmed. While the temperature range in which the polymer liquid crystal composition exhibits a liquid crystal phase depends on the composition of the polymer liquid crystal used, annealing is usually carried out at 0° to 300° C., preferably 20° to 200° C. A suitable annealing time is about 5 seconds to 200 hours, though varying depending on the composition of the polymer liquid crystal composition.

As a result of the heat treatment, a multi-domain structure having a controlled domain size so as to exhibit strong light scattering properties is formed. The polymer liquid crystal composition is crosslinked while it retains the thus regulated multi-domain structure. Crosslinking of the polymer liquid crystal composition can be performed by applying heat, light, electron light, and the like. From the efficiency consideration, crosslinking is preferably carried out simultaneously with the domain size control by the heat treatment. The temperature at the crosslinking is not particularly limited as far as the multi-domain structure can be maintained. A preferred temperature is from the glass transition point of the composition up to the liquid phase-isotropic phase transition point. The crosslinking stabilizes the multi-domain structure to provide a structure that would not change by external temperature change and will always exhibit excellent light scattering properties.

The optical element of the present invention is suitably applied as an optical recording material capable of repeatedly recording and erasing information. In what follows, such an optical element will be illustrated.

A basic structure of the optical element according to the present invention is shown in FIG. 1, which is composed of substrate 1 having formed thereon polymer liquid crystal composition layer (recording layer) 2, and protective layer 3 for imparting surface strength and improved heat resistance in this order. The structure of FIG. 2 additionally has colored layer 4 on the back side of substrate 1, and the structure of FIG. 3 additionally has light reflecting layer 5 between substrate 1 and polymer liquid crystal layer 2.

Figure 2:
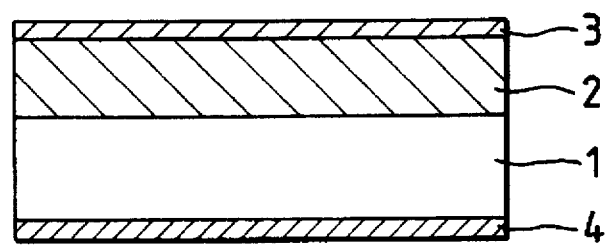
Figure 3:
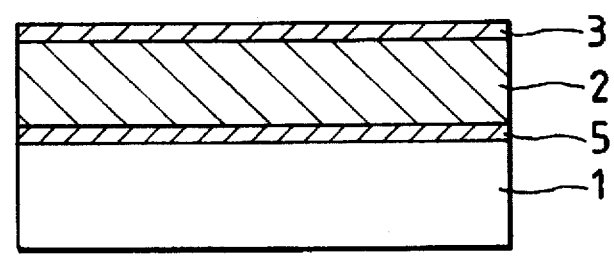

In the structures of FIGS. 1 through 3, light scattering properties are controllable only by heat. The polymer liquid crystal layer prepared by the method of the present invention assumes a light-scattered state (white turbid state) attributed to its multi-domain structure. If part of the polymer liquid crystal layer is heated by means of a thermal head or a laser beam to make the polymer liquid crystal composition isotropic, and the heated area is then rapidly cooled, the heated and cooled area is fixed in its isotropic state to assume a transparent state with little light scattering properties. Information can thus be recorded through control of light scattering properties. The recorded information can be erased by heating followed by cooling slowly thereby to increase the light scattering properties to the initial level. That is, the light scattering state can be altered reversibly and repeatedly to perform recording/erasure of information. In using a thermal head or a laser beam as a heating means for controlling light scattering properties, the light reflection can be controlled out by adjusting the pulse width or energy applied.

Figure 4:
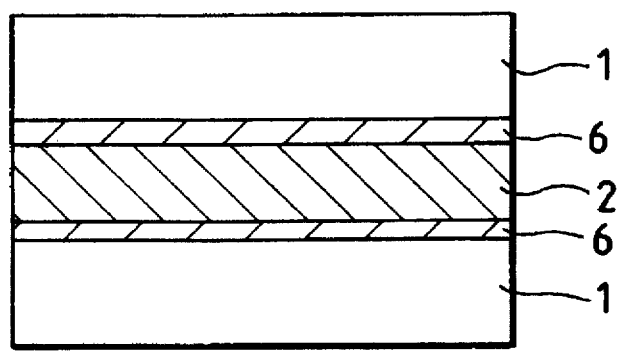

The structure shown in FIG. 4 is composed of a pair of substrates 1, 1 with transparent electrode 6 (ITO) having interposed therebetween polymer liquid crystal layer 2 (recording layer). This type of structure is used in optical devices utilizing the action of an electrical field, a magnetic field or heat.

The polymer liquid crystal layer and protective layer can be formed in a usual manner, for example, by coating a composition for the respective layer as a solution in a solvent or in a molten state.

The thickness of the recording layer is not particularly limited and widely varies according to a desired contrast. It is preferably from 0.1 to 100 µm, still preferably from 1 to 100 µm, yet preferably 5 to 50 µm, most preferably 1 to 20 µm.

The protective layer is preferably a heat-resistant layer comprising a fluorine-containing polymer, a silicon-containing polymer, a thermosetting polymer, an ultraviolet-cured polymer, an electron-cured polymer. The protective layer may have a single or multilayered structure. The protective layer preferably has a thickness of from 0.1 to 20 µm.

The above-described substrates can be used.

It is preferable to provide a light-reflecting layer, a light-absorbing layer or a colored layer for improving contrast as in FIGS. 2 or 3. A metal layer, such as an aluminum layer or a silver layer, is useful as a light-reflecting layer. A dye-containing polymer film is usually used as a light-absorbing layer or a colored layer. The light-reflecting layer, light-absorbing layer or colored layer preferably has a thickness of 0.001 to 100 µm.

Recording/erasure of information using the optical recording device according to the present invention is described below taking recording/erasure by heat application for instance. Recording/erasure of information is also possible by electrical or magnetic field application.

The recording layer after preparation of the element shows a light-scattered (white turbid) state attributed to the multi-domain structure. Information can be recorded on the white turbid recording layer by imagewise applying heat with a thermal head or a laser beam to make the polymer liquid crystal on the heated area isotropic, followed by cooling rapidly to a temperature below the glass transition point, whereby the heated area is fixed in its isotropic phase to form a transparent image. The recorded information can be erased by heating followed by cooling at a rate lower than that used for recording, whereby the area restores the original light-scattered state to complete erasure. That is, recording and erasure of information can be conducted reversibly and repeatedly. Heating means for recording and erasure includes a thermal head. Recording and erasure of information can be carried out by controlling the pulse width or energy applied to the thermal head.

When the domain diameter at the maximum in the frequency distribution of domain diameter is 2 µm or less, especially 1 µm or less which is in the range of visible light, the multi-domain structure provides a high scattering property and an excellent contrast. The domain size can be controlled by slow cooling of the isotropic phase which is heated to liquid crystal phase-isotropic phase transition point or more. This also causes an erasure of the recorded information. By slow cooling, nucleation and nuclear growth are attained to form a multi-domain structure. Rapid cooling does not cause nucleation and thus the heated and rapidly cooled area is fixed in its glass transition phase to be transparent while retaining isotropic state. When the cooling rate is $1 \times 10^{2\circ}$ C./sec or more, the heated and cooled area becomes transparent, and when the cooling rate is less than the speed, the area shows a white turbid state (multi-domain structure). Therefore, the cooling rate is preferably less than $1 \times 10^{2\circ}$ C./sec and more preferably less than 50° C./sec.

The optical element according to the present invention is characterized by containing a polymer liquid crystal composition having an optically anisotropic multi-domain structure which is formed by crosslinking a composition essentially comprising a polymer liquid crystal either as it is or after it is subjected to heat treatment. By the action of the crosslinking, a specific multi-domain structure (microstructure) can be stabilized and fixed (or memorized) in the stabilized state. Therefore, the optical element of the present invention is applicable as an optical recording medium, a display medium, a light modulation element or a reversible heat-sensitive recording medium.

Where a polymer liquid crystal is utilized in a light-scattering type optical element, the degree of light scattering depends on the domain size or density of the multi-domain structure. The conventional multi-domain structure undergoes change in domain size and density from the initial conditions in the course of repetition of recording and erasure or suffers from partial unevenness in domain size and density due to unevenness of thermal history. It follows that the conventional element suffers from reductions in optical characteristics or unevenness of optical density, resulting in poor reproduction. To the contrary, the multi-domain structure (microstructure) of the optical element of the present invention is thermodynamically stabilized, and the initial conditions of domain size and density have been memorized so that these conditions of the multi-domain structure are reproduced even through repeated thermal history. Further, where an optically anisotropic multi-domain structure is formed by cooling a polymer liquid crystal composition which has been heated and is exhibiting an optically isotropic phase, the element has an increased rate of multi-domain formation. Accordingly, the optical element of the present invention applied as a recording/display element exhibits excellent stability in reproducing recording/display/erasure performance while achieving improvements in optical characteristics and speeding up of recording/display/erasure.

Another optical element according to the present invention uses a polymer liquid crystal composition containing a copolymer comprising at least a mesogen monomer unit and a non-mesogen monomer unit. In this polymer liquid crystal composition at least two components, i.e., a liquid crystal component and a non-liquid crystal component, form the respective phase to provide a multi-domain structure which shows strong light scattering properties, i.e., excellent optical characteristics. Further, since the polymer liquid crystal composition has a crosslinked structure, the multi-domain structure (microstructure) has been thermodynamically stabilized with the initial domain size or domain density being memorized. Therefore, the initial domain size and density are repeatedly reproduced even when heating and cooling for recording and erasure are repeated. That is, the optical element, when utilized as a light scattering type element, exhibits excellent optical characteristics with excellent reproduction. Even when the element is used as a wide area recording device, uniform optical characteristics are assured owing to the stabilized multi-domain structure (light-scattered state). Further, the rate of forming an anisotropic multi-domain structure (light-scattered state) in the cooling stage from the heated state (i.e., the isotropic phase) is high, making it feasible to speed up recording/erasure.

In short, since the polymer liquid crystal composition of the present invention has a stabilized multi-domain structure, the initial domain size and density of the multi-domain structure can be reproduced even when a heating and cooling cycle is repeatedly given and, when used as an optical element or an optical recording device, achieves an increased recording/erasure speed.

The method for forming an unerasable image according to the present invention is then described. According to the image formation method, an image showing no light scattering properties is formed in a part of an optical element comprising the above-described light-scattering polymer liquid crystal composition, and the composition is then crosslinked to thereby make that image unerasable. An image showing no light scattering properties can be formed by applying heat, an electrical field or a magnetic field either alone or in a combination thereof to the polymer liquid crystal composition thereby to control the orientation or order of the composition. It is particularly preferable that the image showing no light scattering properties is optically transparent because the formed image is more stable where the polymer liquid crystal composition is optically isotropic. In an optically isotropic polymer liquid crystal composition as referred to above, the orientation of the side chain liquid crystal molecules (mesogen) in the polymer liquid crystal composition is at random on nearly a molecular level. An optically transparent image showing no light scattering properties can be formed by imagewise heating part of the light scattering polymer liquid crystal composition to a temperature above the liquid phase-isotropic phase transition point (the temperature at which no light scattering properties are exhibited) followed by rapidly cooling to a temperature below the glass transition point. At this time, the image having no light scattering properties is a transparent image in which the side chain liquid crystal molecules in the polymer liquid crystal composition are oriented at random on nearly a molecular level, and the image is fixed as such (as transparent) like glass.

The polymer liquid crystal composition is then crosslinked to make the image having no light scattering properties unerasable. Crosslinking of the polymer liquid crystal composition can be carried out by applying heat, light, an electron beam, etc. thereby causing the reactive group of the polymer liquid crystal to polymerize or to undergo addition reaction with a polyfunctional reactive compound. The crosslinking temperature is below the liquid crystal phase-isotropic phase transition point of the polymer liquid crystal composition, preferably not higher than the glass transition point of the composition. If the composition is heated to the liquid crystal phase-isotropic phase transition point or higher, the image showing no light scattering properties would disappear before crosslinking. At the glass transition point or lower, crosslinking proceeds with the image showing no light scattering properties being fixed stably, making it possible to form a clearer image.

The thus crosslinked area becomes stable against heat. Taking advantage of this effect, an unerasable permanent image can be formed on an element by forming an image before crosslinking and then stabilizing the image by subsequent crosslinking to provide a recording device having a combination of a permanent image and a rewritable recording area. This is characterized, particularly, in the embodiment (iv).

Figure 5:
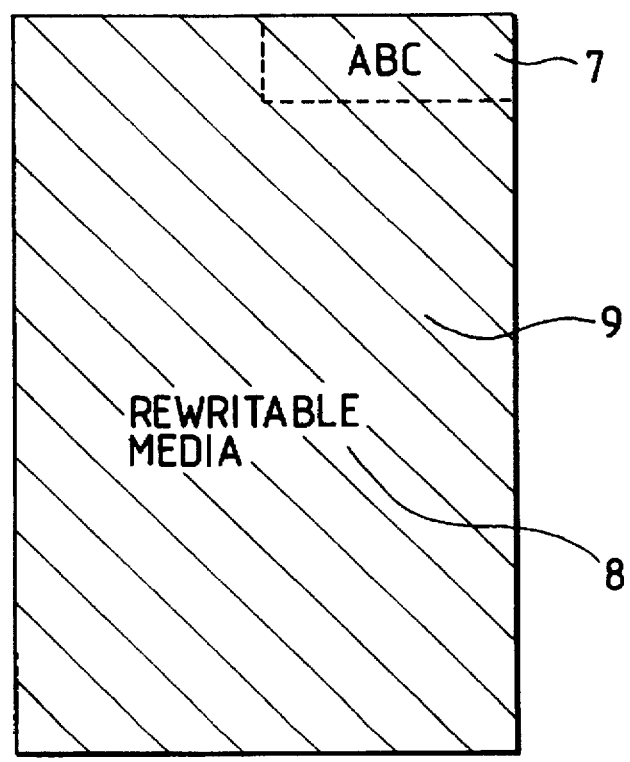
FIG. 5 is a plane view of an optical element having formed thereon an erasable image and an unerasable image.

The following is an example of an optical element having formed on part of it an unerasable image by the image formation method of the present invention. In FIG. 5 is shown a plane view of an optical element having the layer structure of FIG. 1 in which an unerasable image has been formed. Numerals 7, 8 and 9 indicate an unerasable image, an erasable image, and an area capable of recording an erasable image, respectively. Unerasable image 7 has been formed by imagewise heating an evenly light-scattering (white turbid) recording layer before crosslinking with a thermal head or a laser beam followed by rapid cooling and then applying heat, light or an electron beam on the entire area of the element to include crosslinking. Once the recording layer has been crosslinked, the thus formed image never restores the initial white turbidity even if heated to the liquid phase-isotropic phase transition point or higher followed by cooling, and the image is preserved semi-permanently. The area other than the unerasable image, i.e., area 9 is capable of recording and erasing information repeatedly. Recording on area 9 can be conducted by imagewise heating to a temperature not lower than the liquid phase-isotropic phase transition point with a thermal head or a laser beam followed by rapid cooling, and the recorded image can be erased by heating the image followed by gradual cooling. There is thus provided an optical element having both unerasable image 7 and erasable image 8.

In the above-illustrated embodiment, when an image exhibiting no light scattering properties is formed on an optical element comprising a light scattering polymer liquid crystal composition, and the composition is crosslinked, the image having no light scattering properties becomes a semi-permanently memorized image that would not be erased any more even if heated to a temperature for an isotropic phase. This is believed to be because the orientation or order of the liquid crystal molecules constituting the image having no light scattering properties could be fixed and retained upon undergoing crosslinking. On the other hand, the area showing light scattering properties is still capable of repetition of recording (a transparent state) and erasure (a white turbid state) on repeating a heating/cooling cycle even after the crosslinking. This seems to be because crosslinking in the optically anisotropic multi-domain structure exhibiting light scattering properties does not restrain the molecular movement of liquid crystal molecules.

The aforesaid effects make it possible to integrate an unerasable image and a rewritable image on the same optical element having light scattering properties.

The present invention will be illustrated in greater detail with reference to Examples, but it should be understood that the present invention is not deemed to be limited thereto. All the copolymerization ratios shown in structural formulae are given by weight.

In Examples and Comparative Examples, physical properties of polymer liquid crystals prepared were measured as follows.

1) Weight Average Molecular Weight and Molecular Weight Distribution:

A weight average molecular weight (Mw) and a number average molecular weight (Mn) were measured by gel-permeation chromatography (GPC) using a chromatograph manufactured by Tosoh Corp. on polystyrene conversion. A molecular weight distribution was evaluated in terms of an Mw/Mn ratio.

2) Glass Transition Point and Phase Transition Point:

A glass transition point (Tg) and a liquid crystal phase-isotropic phase transition point (Ti) of a polymer liquid crystal were measured by differential scanning calorimetry and with a polarizing microscope equipped with a temperature controller.

EXAMPLE 1

4-Acryloxyhexyloxy-4'-cyanobiphenyl (1.9 g) as a mesogen monomer and 0.1 g of 2-hydroxyethyl acrylate as a reactive monomer were copolymerized using azobisisobutyronitrile (ABIN) as an initiator and tetrahydrofuran (THF) as a solvent. The polymer was purified by reprecipitating three times in ethyl alcohol to give 1.9 g of a polymer liquid crystal having structural formula (1):

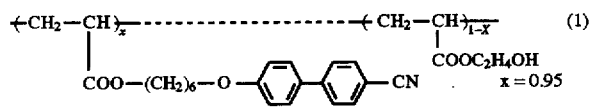

The polymer liquid crystal having formula (1) [hereinafter designated polymer liquid crystal (1); the similar designation will apply to other polymer liquid crystals] had an Mw of 40000, a Tg of 40° C., and a Ti of 110° C.

In 3.0 g of methyl ethyl ketone (MEK) were dissolved 1.0 g of polymer liquid crystal (1) and 0.05 g of a polyfunctional isocyanate compound Colonate HX (produced by Nippon Polyurethane Industry Co., Ltd.) as a crosslinking agent, and the solution was applied on a 100 μm thick aluminum-deposited polyethylene terephthalate (PET) film with a blade coater and dried to form a polymer liquid crystal layer having a thickness of about 6 μm. The polymer liquid crystal layer as obtained scattered light and assumed white turbidity and was found to have a Ti of about 90° C.

The polymer liquid crystal layer was crosslinked in an oven at 60° C. for 24 hours. The polymer liquid crystal layer after crosslinking was also white turbid. An ultraviolet-curing composition Aronix UV (produced by Toagosei Chemical Industry Co., Ltd.) was applied on the crosslinked polymer liquid crystal layer and cured using a high-pressure mercury lamp to form an about 2 μm thick protective layer to prepare an optical recording device.

EXAMPLE 2

Polymer liquid crystal (2) having structural formula (2) shown below was synthesized in the same manner as in Example 1, except for using acrylic acid as a reactive monomer.

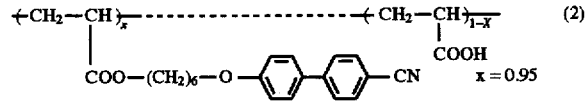

Polymer liquid crystal (2) had an Mw of 40000, a Tg of 50° C., and a Ti of 125° C.

In 3.0 g of MEK were dissolved 1.0 g of polymer liquid crystal (2) and 0.03 g of hexamethylene diisocyanate as a polyfunctional isocyanate compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 100° C.

The polymer liquid crystal layer was crosslinked in an oven at 60° C. for 24 hours. The polymer liquid crystal layer after crosslinking was also white turbid. A protective layer was formed on the crosslinked polymer liquid crystal layer in the same manner as in Example 1 to obtain an optical recording device.

EXAMPLE 3

Polymer liquid crystal (3) having structural formula (3) shown below was synthesized in the same manner as in Example 1, except for using 0.1 g of glycidyl acrylate as a reactive monomer.

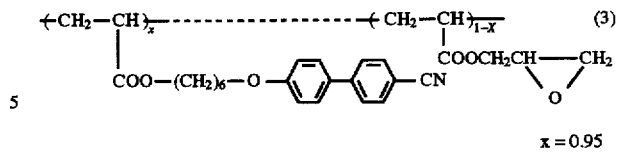

Polymer liquid crystal (3) had an Mw of 40000, a Tg of 36° C., and a Ti of 95° C.

In 3.0 g of MEK were dissolved 1.0 g of polymer liquid crystal (3) and 0.04 g of hexamethylenediamine as a polyfunctional amine compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 90° C.

The polymer liquid crystal layer was crosslinked in an oven at 60° C. for 24 hours. The polymer liquid crystal layer after crosslinking was also white turbid. A protective layer was formed on the crosslinked polymer liquid crystal layer in the same manner as in Example 1 to obtain an optical recording device.

EXAMPLE 4

Polymer liquid crystal (1) synthesized in Example 1 was reacted with acrylic acid chloride in methylene chloride in the presence of triethylamine to obtain polymer liquid crystal (4) having an acrylate group introduced to the side chain thereof and having structural formula (4):

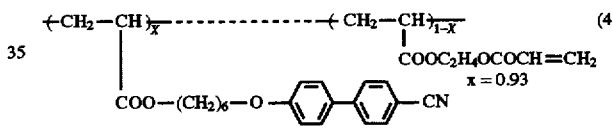

Polymer liquid crystal (4) had an Mw of 55000, a Tg of 33° C., and a Ti of 85° C.

In 3.0 g of MEK were dissolved 1.0 g of polymer liquid crystal (4) and 0.01 g of an ultraviolet polymerization initiator Darocure 1173 (produced by Ciba-Geigy Ltd.), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 80° C.

The polymer liquid crystal layer was crosslinked by ultraviolet irradiation at 25° C. using a high-pressure mercury lamp. The polymer liquid crystal layer after crosslinking was also white turbid. A protective layer was formed on the crosslinked polymer liquid crystal layer in the same manner as in Example 1 to obtain an optical recording device.

COMPARATIVE EXAMPLE 1

An optical recording device was prepared in the same manner as in Example 1, except no crosslinking agent was added to polymer liquid crystal (1). The recording device as obtained showed slight white turbidity.

COMPARATIVE EXAMPLE 2

Polymer liquid crystal (5) having structural formula (5) shown below was synthesized in the same manner as in Example 1, except that only the mesogen monomer was homopolymerized.

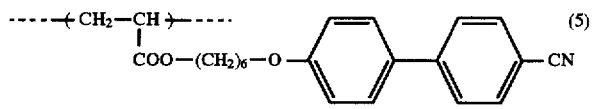

Polymer liquid crystal (5) had an Mw of 30000, a Tg of 35° C., and a Ti of 120° C.

An optical recording device was prepared in the same manner as in Comparative Example 1, except for using polymer liquid crystal (5). The recording device as obtained showed white turbidity.

Evaluation:

Each of the recording devices prepared in Examples 1 to 4 and Comparative Examples 1 and 2 was evaluated by a recording test as follows.

Recording was conducted using a thermal printer (dot density: 8 dots/mm; recording energy: $\leq 0.3$ mJ/dot), and the transparent recorded image was erased using a hot stamp set at 130° C. The reflective optical density of the recording layer was measured with a densitometer X-rite 968 (manufactured by X-rite Co.) in the stages; (a) before recording (in a light-scattered state), (b) after recording (in a transparent state), (c) after first erasure (in a light-scattered state), and (d) after repeating recording/erasure 100 times (in a light-scattered state), to evaluate reproduction of recording/erasure performance. The results obtained are shown in Table 1 below.

TABLE 1

| Example No. | Optical Density of Recording Layer | | | |
|---|---|---|---|---|
| | (a) | (b) | (c) | (d) |
| Example 1 | 0.24 | 1.7 | 0.24 | 0.24 |
| Example 2 | 0.24 | 1.7 | 0.24 | 0.24 |
| Example 3 | 0.25 | 1.7 | 0.25 | 0.25 |
| Example 4 | 0.25 | 1.7 | 0.25 | 0.25 |
| Comparative Example 1 | 0.4 | 1.7 | 0.8 | 1.2 |
| Comparative Example 2 | 0.5 | 1.1 | 1.0 | 1.0 |

As is apparent from Table 1, the recording layer in Examples 1 to 4 undergoes no change from the initial state in degree of white turbidity (reflective optical density) in a light-scattered state even after repeating recording/erasure 100 times, proving excellent reproducibility of whiteness. The recording layer in Comparative Examples 1 and 2 not only has a low degree of white turbidity in its initial stage but also suffers from great reduction in white turbidity upon receiving only one cycle of recording/erasure, i.e., remarkable deterioration in reproduction of whiteness.

Further, the domain diameter of the multi-domain structure after repeating recording/erasure 100 times was measured with a laser diffraction particle size distribution analyzer LA-700 (manufactured by Horiba) to determine the domain distribution and the domain diameter at the maximum of the frequency distribution of domain diameter. It was found as a result that the recording layers of Examples 1 to 4, after receiving 100 cycles of recording/erasure, had a domain diameter distributed over a range of from 50 nm to 1400 nm with the diameter at the maximum of the frequency distribution of domain diameter being 400 to 700 nm. In Comparative Examples 1 and 2, the domain diameter at the maximum of the frequency distribution was 2.5 µm and 2.0 µm, respectively, and the domain diameter was distributed over a range of from 700 nm to 11.5 µm. It is understood from these facts that the deterioration in optical characteristics in Comparative Examples 1 and 2 as shown in Table 1 is ascribable chiefly to growth of domains, which results in reduction in white turbidity. Accordingly, it is seen that a domain size in a multi-domain structure influences display characteristics (optical characteristics) and that the stability of the multi-domain structure has great influences on reproduction of recording/erasure performance on repeated use.

As is apparent from the above results, the optical element according to the present invention has its minute multi-domain structure thermodynamically stabilized by crosslinking and therefore exhibits excellent display characteristics (optical characteristics) and excellent reproduction of recording/erasure performance.

EXAMPLE 5

4-Acryloxyhexyloxy-4'-cyanobiphenyl (1.9 g) as a mesogen monomer and 0.1 g of 2-hydroxyethyl acrylate as a reactive monomer were copolymerized using ABIN as an initiator and THF as a solvent. The polymer was purified by reprecipitating three times in ethyl alcohol to give 1.9 g of polymer liquid crystal (1).

In 3.0 g of MEK were dissolved 1.0 g of polymer liquid crystal (1) and 0.05 g of a polyfunctional isocyanate compound Colonate HX as a crosslinking agent, and the solution was applied on a 100 µm thick aluminum-deposited PET film with a blade coater and dried to form a polymer liquid crystal layer having a thickness of about 6 µm. The polymer liquid crystal layer as obtained scattered light and assumed white turbidity to act as a controlling film of light scattering. The Ti of the polymer liquid crystal layer before crosslinking was about 90° C.

The polymer liquid crystal layer was subjected to annealing by heating in an oven at 60° C. for 10 minutes and then crosslinked in an oven at 30° C. for 72 hours. An about 2 µm thick protective layer was formed on the crosslinked polymer liquid crystal layer in the same manner as in Example 1 to prepare an optical recording device.

The domain diameter at the maximum of the frequency distribution of domain diameter of the multi-domain structure was 300 nm. The difference between the maximum domain diameter and the minimum domain diameter was 0.9 µm.

EXAMPLE 6

Polymer liquid crystal (6) having structural formula (6) shown below was synthesized in the same manner as in Example 5, except for using 1.8 g of the mesogen monomer, 0.1 g of the reactive non-mesogen monomer and, in addition, 0.1 g of butyl acrylate as a third monomer.

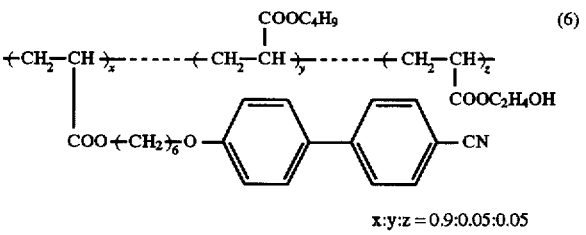

x:y:z = 0.9:0.05:0.05

In 3.0 g of MEK were dissolved 1.0 g of polymer liquid crystal (6) and 0.05 g of a polyfunctional isocyanate compound Colonate HX as a crosslinking agent, and the solution was applied on a 100 µm thick aluminum-deposited PET film with a blade coater and dried to form a polymer liquid crystal layer having a thickness of about 6 μm. The polymer liquid crystal layer as obtained scattered light and assumed white turbidity to act as a controlling film of light scattering. The Ti of the polymer liquid crystal layer before crosslinking was about 85° C.

The polymer liquid crystal layer was heated in an oven at 70° C. for 24 hours to conduct annealing and crosslinking simultaneously. A protective layer was formed on the crosslinked polymer liquid crystal layer in the same manner as in Example 1 to prepare an optical recording device. The domain diameter at the maximum of the frequency distribution of domain diameter of the multi-domain structure was 330 nm. The difference between the maximum domain diameter and the minimum domain diameter was 0.8 μm.

EXAMPLE 7

Polymer liquid crystal (7) having structural formula (7) shown below was synthesized in the same manner as in Example 5, except for using 1.8 g of the mesogen monomer, 0.1 g of glycidyl acrylate as a reactive non-mesogen monomer and 0.1 g of butyl methacrylate as a non-mesogen monomer.

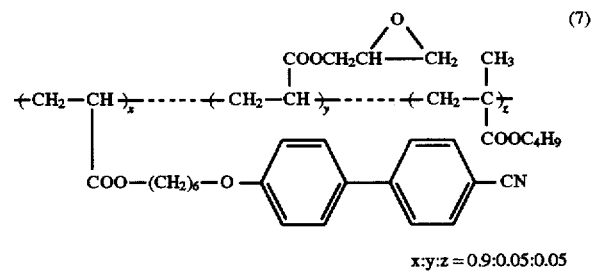

(7)

x:y:z = 0.9:0.05:0.05

In 3.0 g of MEK were dissolved 1.0 g of polymer liquid crystal (7) and 0.02 g of hexamethylenediamine as a polyfunctional amine compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity to act as a controlling film of light scattering. The Ti of the polymer liquid crystal layer before crosslinking was about 90° C.

The polymer liquid crystal layer was annealed in an oven at 60° C. for 10 minutes and then crosslinked in an oven at 50° C. for 24 hours. A protective layer was formed on the crosslinked polymer liquid crystal layer in the same manner as in Example 1 to prepare an optical recording device. The domain diameter at the maximum of the frequency distribution of domain diameter of the multi-domain structure was 280 nm. The difference between the maximum domain diameter and the minimum domain diameter was 1.0 μm.

COMPARATIVE EXAMPLE 3

An optical recording device was prepared in the same manner as in Example 5, except that a crosslinking reaction using a crosslinking agent was not conducted. The recording device as obtained showed white turbidity.

COMPARATIVE EXAMPLE 4

An optical recording device was prepared in the same manner as in Example 5, except that the polymer liquid crystal layer was not subjected to annealing. The recording device as obtained showed white turbidity.

Evaluation:

Each of the recording devices prepared in Examples 5 to 7 and Comparative Examples 3 and 4 was evaluated by a recording test as follows.

Recording and erasure of information were conducted in the same manner as in Examples 1 to 4. The reflective optical density of the recording layer was measured with a densitometer X-rite 968 in stages: (a-1) before annealing (in a light-scattered state), (a-2) after annealing (in a light-scattered state), (c) after first erasure (in a light-scattered state), and (d) after repeating recording/erasure 100 times (in a light-scattered state), to evaluate recording/erasure reproducibility and display quality on repeated use. The results obtained are shown in Table 2 below.

TABLE 2

| Example No. | Optical Density of Recording Layer | | | |
|---|---|---|---|---|
| | (a-1) | (a-2) | (c) | (d) |
| Example 5 | 0.37 | 0.22 | 0.23 | 0.21 |
| Example 6 | 0.31 | 0.20 | 0.20 | 0.21 |
| Example 7 | 0.29 | 0.24 | 0.23 | 0.24 |
| Comparative Example 3 | 0.60 | 0.41 | 0.96 | 1.2 |
| Comparative Example 4 | 0.37 | — | 0.37 | 0.38 |

As is apparent from Table 2, the recording devices of Examples 5, 6, and 7 show substantially no change in reflective optical density among the light-scattered state before recording (after annealing), that after first erasure, and that after repeating recording/erasure 100 times, proving excellent whiteness reproducibility. In Comparative Example 3, since the polymer liquid crystal layer is not crosslinked, no improvement on optical density reproduction on repeated use is obtained even by annealing. In the case of Comparative Example 4, since the recording layer cannot enjoy the effect of annealing, the reflective optical density in the initial stage is not optimized, and there is no difference between the reflective optical density before recording and that after first erasure, indicating poor display characteristics (white turbidity).

It is obvious from these results that the optical element prepared by the method of the present invention is excellent in reproduction of recording/erasure performance and display characteristics.

EXAMPLE 8

4-Acryloxyhexyloxy-4'-cyanobiphenyl (1.8 g) as a mesogen monomer, 0.1 g of 2-hydroxyethyl acrylate as a reactive non-mesogen monomer, and 0.1 g of butyl methacrylate as a non-mesogen monomer were copolymerized using ABIN as an initiator and THF as a solvent. The polymer was purified by reprecipitating three times in ethyl alcohol to give 1.9 g of polymer liquid crystal (8) having structural formula (8):

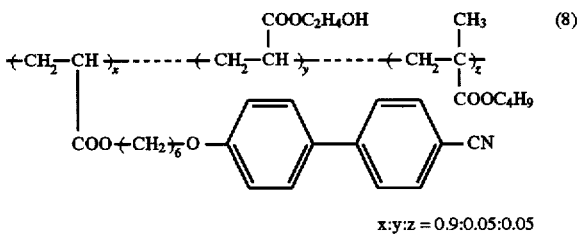

(8)

x:y:z = 0.9:0.05:0.05

Polymer liquid crystal (8) had an Mw of 55000, a Tg of 42° C., and a Ti of 105° C.

In 3.0 g of MEK were dissolved 1.0 g of polymer liquid crystal (8) and 0.05 g of a polyfunctional isocyanate compound Colonate HX as a crosslinking agent, and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 100° C.

The polymer liquid crystal layer was crosslinked in an oven at 50° C. for 24 hours. The polymer liquid crystal layer after crosslinking was also white turbid. An about 2 μm thick protective layer was formed on the crosslinked polymer liquid crystal layer in the same manner as in Example 1 to obtain an optical recording device.

EXAMPLE 9

Polymer liquid crystal (9) having structural formula (9) shown below was synthesized in the same manner as in Example 8, except for replacing 0.1 g of butyl methacrylate as a non-mesogen monomer with 0.1 g of butyl acrylate.

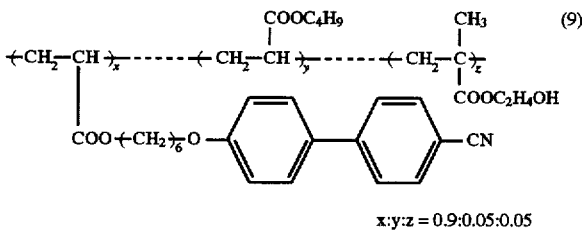

x:y:z = 0.9:0.05:0.05

Polymer liquid crystal (9) had an Mw of 50000, a Tg of 40° C., and a Ti of 90° C.

In 3.0 g of MEK were dissolved 1.0 g of polymer liquid crystal (9) and 0.03 g of diphenylmethane diisocyanate as a polyfunctional isocyanate compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 85° C.

The polymer liquid crystal layer was crosslinked in an oven at 50° C. for 24 hours. The polymer liquid crystal layer after crosslinking was also white turbid. A protective layer was formed on the crosslinked polymer liquid crystal layer in the same manner as in Example 1 to obtain an optical recording device.

EXAMPLE 10

Polymer liquid crystal (10) having structural formula (10) shown below was synthesized in the same manner as in Example 8, except for using 1.7 g of the same mesogen monomer as used in Example 8, 0.1 g of acrylic acid as a reactive non-mesogen monomer, and 0.2 g of ethyl methacrylate as a non-mesogen monomer.

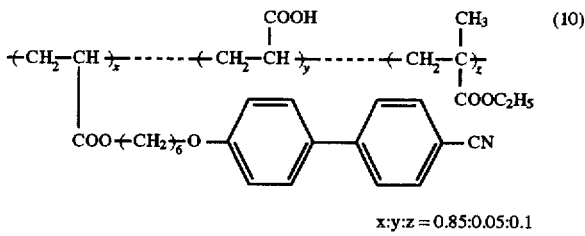

x:y:z = 0.85:0.05:0.1

Polymer liquid crystal (10) had an Mw of 55000, a Tg of 45° C., and a Ti of 110° C.

In 3.0 g of MEK were dissolved 1.0 g of polymer liquid crystal (10) and 0.03 g of hexamethylene diisocyanate as a polyfunctional isocyanate compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 105° C.

The polymer liquid crystal layer was crosslinked in an oven at 50° C. for 24 hours. The polymer liquid crystal layer after crosslinking was also white turbid. A protective layer was formed on the crosslinked polymer liquid crystal layer in the same manner as in Example 1 to obtain an optical recording device.

EXAMPLE 11

Polymer liquid crystal (11) having structural formula (11) shown below was synthesized in the same manner as in Example 8, except for replacing 0.1 g of 2-hydroxyethyl acrylate as a reactive non-mesogen monomer with 0.1 g of glycidyl acrylate.

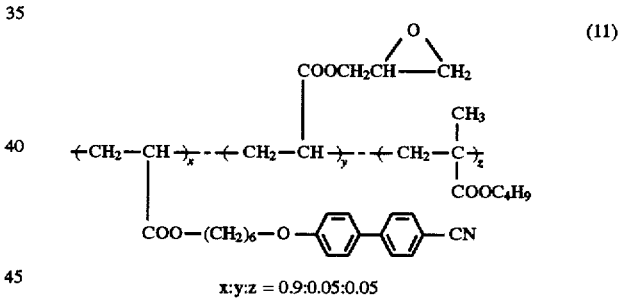

x:y:z = 0.9:0.05:0.05

Polymer liquid crystal (11) had an Mw of 45000, a Tg of 45° C., and a Ti of 95° C.

In 3.0 g of MEK were dissolved 1.0 g of polymer liquid crystal (11) and 0.02 g of hexamethylenediamine as a polyfunctional amine compound (crosslinking agent), and the solution was applied on a 100 μm thick aluminum-deposited PET film with a blade coater and dried to form a polymer liquid crystal layer having a thickness of about 6 μm. The polymer liquid crystal layer as obtained scattered light and assumed white turbidity. The Ti of the polymer liquid crystal layer before crosslinking was about 90° C.

The polymer liquid crystal layer was crosslinked in an oven at 60° C. for 24 hours. The polymer liquid crystal layer after crosslinking was also white turbid. A protective layer was formed on the crosslinked polymer liquid crystal layer in the same manner as in Example 1 to obtain an optical recording device.

COMPARATIVE EXAMPLE 5

An optical recording device was prepared in the same manner as in Example 8, except that no crosslinking agent was added to polymer liquid crystal (8). The recording device as obtained showed white turbidity.
Evaluation:
The recording devices prepared in Examples 8 to 11 and Comparative Example 5 were tested in the same manner as in Example 1 to evaluate reproduction in recording/erasure performance. The results obtained are shown in Table 3.

TABLE 3

| Example | Optical Density of Recording Layer | | | |
|---|---|---|---|---|
| No. | (a) | (b) | (c) | (d) |
| Example 8 | 0.20 | 1.7 | 0.21 | 0.21 |
| Example 9 | 0.22 | 1.7 | 0.22 | 0.22 |
| Example 10 | 0.22 | 1.7 | 0.22 | 0.22 |
| Example 11 | 0.24 | 1.7 | 0.24 | 0.24 |
| Comparative Example 5 | 0.35 | 1.7 | 0.6 | 0.8 |

Note:
(a) Before recording (in a light-scattered state)
(b) After recording (in a transparent state)
(c) After first erasure (in a light-scattered state)
(d) After repeating recording/erasure 100 times (in a light-scattered state)

As is apparent from Table 3, the recording layer in Examples 8 to 11 undergoes no change from the initial stage in degree of white turbidity (reflective optical density in a light-scattered state) even after receipt of 100 cycles of recording/erasure, proving excellent in reproducibility of white turbidity. The recording layer in Comparative Example 5 not only has a low degree of white turbidity in its initial stage but also suffers from great reduction in white turbidity upon receiving only one heat cycle of recording/erasure, i.e., remarkable deterioration in reproduction.

After 100 cycles of recording/erasure, the recording layers of Examples 8 to 11 had a domain diameter distributed over a range of from 50 nm to 1200 nm with the diameter at the maximum of the frequency distribution of domain diameter being 350 to 650 nm. In Comparative Examples 5 and 6, the domain diameter at the maximum of the frequency distribution was 2.5 µm and 1.8 µm, respectively, and the domain diameter was distributed over a range of from 800 nm to 12 µm. It is understood from these facts that the deterioration in optical characteristics in Comparative Examples 5 and 6 as shown in Table 3 is ascribed chiefly to growth of domains which results in reduction in white turbidity. Accordingly, it is seen that a domain size in a multi-domain structure influences display characteristics (optical characteristics) and that the stability of the multi-domain structure has great influences on reproduction of recording/erasure performance on repeated use.

As is apparent from the above results, the optical element according to the present invention has its minute multi-domain structure thermodynamically stabilized by crosslinking and therefore exhibits excellent display characteristics (optical characteristics) and reproducibility of recording/erasure performance.

In Examples 12 to 15 hereinafter described, an image formation method of the present invention and an optical element having an unerasable image are embodied. In these Examples, recording on an optical element either for formation of an unerasable image and for formation of an erasable image was conducted using a thermal printer (8 dots/mm; ≦0.3 mJ/dot). Erasure of an erasable image was conducted using an oven set at 120° C. or a hot stamp set at 130° C. The reflective optical density of each recorded area before and after heating at 120° C. was measured with X-rite 968 to evaluate optical characteristics.

EXAMPLE 12

In 3.0 g of MEK were dissolved 1.0 g of polymer liquid crystal (1) (Mw: 40000; Tg: 40° C.; Ti: 110° C.) synthesized in Example 1 and 0.05 g of diphenylmethane diisocyanate (produced by Tokyo Kasei K.K.) as a polyfunctional isocyanate compound (crosslinking agent), and the solution was applied on a 100 µm thick aluminum-deposited PET film with a blade coater and dried to form a polymer liquid crystal layer having a thickness of about 6 µm. A protective layer was formed on the polymer liquid crystal layer in the same manner as in Example 1 to obtain an optical element. The optical element as obtained showed white turbidity.

Recording on part of the optical element was made to form a transparent image, and the optical element was subjected to crosslinking in an oven at 40° C. for 24 hours. After crosslinking, the optical element was heated to 120° C., whereupon the entire area of the optical element turned transparent. On cooling to room temperature, the area having formed a transparent image before crosslinking remained transparent whereas the other area turned white turbid. When recording was conducted on the area which had been crosslinked in its white turbid state, a transparent image showing no light scattering properties was formed. The thus formed transparent image could be erased by heating followed by cooling in the same manner as described above. That is, the transparent image area restored the initial white turbidity by the erasure. The reflective optical density of each recording area before and after heating 120° C. is shown in Table 4 below.

EXAMPLE 13

In 3.0 g of MEK were dissolved 1.0 g of polymer liquid crystal (2) (Mw: 40000; Tg: 50° C.; Ti: 125° C.) synthesized in Example 2 and 0.03 g of hexamethylene diisocyanate as a polyfunctional isocyanate compound (crosslinking agent), and the solution was applied on a 100 µm thick aluminum-deposited PET film with a blade coater and dried to form a polymer liquid crystal layer having a thickness of about 6 µm. A protective layer was formed on the polymer liquid crystal layer in the same manner as in Example 1 to obtain an optical element. The optical element as obtained showed white turbidity.

Recording on part of the optical element was made to form a transparent image, and the optical element was subjected to crosslinking in an oven at 40° C. for 24 hours. After crosslinking, the optical element was heated to 120° C., whereupon the entire area of the optical element turned transparent. On cooling to room temperature, the area once having formed a transparent image before crosslinking remained transparent whereas the other area turned white turbid. When recording was conducted on the area which had been crosslinked in its white turbid state, a transparent image showing no light scattering properties was formed. The thus formed transparent image could be erased by heating followed by cooling in the same manner as described above. That is, the transparent image area restored the initial white turbidity by the erasure. The reflective optical density of each recording area before and after heating 120° C. is shown in Table 4 below.

EXAMPLE 14

In 3.0 g of MEK were dissolved 1.0 g of polymer liquid crystal (3) (Mw: 40000; Tg: 36° C.; Ti: 95° C.) synthesized in Example 3 and 0.04 g of hexamethylenediamine as a polyfunctional amine compound (crosslinking agent), and the solution was applied on a 100 μm thick aluminum-deposited PET film with a blade coater and dried to form a polymer liquid crystal layer having a thickness of about 6 μm. A protective layer was formed on the polymer liquid crystal layer in the same manner as in Example 1 to obtain an optical element. The optical element as obtained showed white turbidity.

Recording on part of the optical element was made to form a transparent image, and the optical element was subjected to crosslinking in an oven at 50° C. for 24 hours. After crosslinking, the optical element was heated to 120° C., whereupon the entire area of the optical element turned transparent. On cooling to room temperature, the area once having formed a transparent image before crosslinking remained transparent whereas the other area turned white turbid. When recording was conducted on the area which had been crosslinked in its white turbid state, a transparent image showing no light scattering properties was formed. The thus formed transparent image could be erased by heating followed by cooling in the same manner as described above. That is, the transparent image area restored the initial white turbidity by the erasure. The reflective optical density of each recording area before and after heating 120° C. is shown in Table 4 below.

EXAMPLE 15

In 3.0 g of MEK were dissolved 1.0 g of polymer liquid crystal (4) (Mw: 55000; Tg: 33° C.; Ti: 85° C.) synthesized in Example 4 and 0.01 g of Darocure 1173 as an ultraviolet polymerization initiator, and the solution was applied on a 100 μm thick aluminum-deposited PET film with a blade coater and dried to form a polymer liquid crystal layer having a thickness of about 6 μm. A resin composition for a protective layer (Symac US-350, produced by Toagosei Chemical Industry Co., Ltd.) was applied on the polymer liquid crystal layer to form an about 2 μm thick protective layer to obtain an optical element. The optical element as obtained showed white turbidity.

After recording on part of the optical element was conducted to form a transparent image, the optical element was irradiated with ultraviolet light using a high-pressure mercury lamp to crosslink the polymer liquid crystal. After crosslinking, the optical element was heated to 120° C., whereupon the entire area of the optical element turned transparent. On cooling to room temperature, the area having formed a transparent image before crosslinking remained transparent whereas the other area turned white turbid. When recording was conducted on the area which had been crosslinked in its white turbid state, a transparent image showing no light scattering properties was formed. The thus formed transparent image could be erased by heating followed by cooling in the same manner as described above. That is, the transparent image area restored the initial white turbidity by the erasure. The reflective optical density of each recording area before and after heating 120° C. is shown in Table 4 below.

TABLE 4

| | Reflective Optical Density | | | |
|---|---|---|---|---|
| | Recording Before Crosslinking | | Recording After Crosslinking | |
| Example No. | Before Heating | After Heating | Before Heating | After Heating |
| Example 12 | 1.6 | 1.6 | 1.6 | 0.24 |
| Example 13 | 1.6 | 1.6 | 1.6 | 0.24 |
| Example 14 | 1.6 | 1.6 | 1.6 | 0.25 |
| Example 15 | 1.6 | 1.6 | 1.6 | 0.25 |

EXAMPLE 16

4-Methacryloxyhexyloxy-4'-cyanobiphenyl (2.0 g) was polymerized as a mesogen monomer by living anionic polymerization at 50° C. using 1.0 mg of butyl lithium as a polymerization initiator and 10 ml of THF as a solvent. The resulting polymer solution was purified by precipitating twice in ethyl alcohol as a poor solvent to recover 1.9 g of polymer liquid crystal (12) having formula (12):

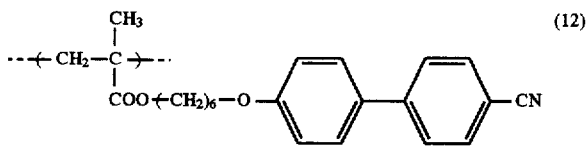

Polymer liquid crystal (12) had an Mw of about 120,000, an Mw/Mn ratio of 1.2, a Tg of about 55° C., and a Ti of 115° C.

A solution of polymer liquid crystal (12) in MEK was applied on a 100 μm thick aluminum-deposited PET film with a blade coater and dried to form a polymer liquid crystal layer having a thickness of about 5 μm. An about 2 μm thick protective layer was formed thereon in the same manner as in Example 1 to prepare a recording medium.

EXAMPLE 17

4-Methacryloxyhexyloxy-4'-cyanobiphenyl (1.9 g) as a mesogen monomer and 0.1 g of 2-hydroxyethyl acrylate as a reactive monomer were copolymerized using 0.01 g of ABIN as a polymerization initiator and 6.0 ml of MEK as a solvent. The resulting polymer solution was purified by precipitating twice in ethyl alcohol as a poor solvent to recover 1.9 g of a polymer liquid crystal having formula (13):

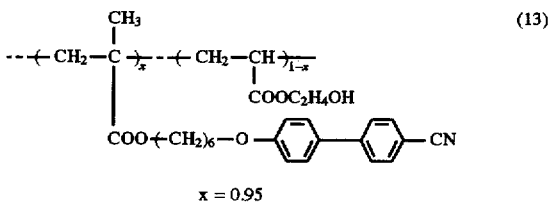

x = 0.95

The resulting polymer liquid crystal had an Mw of about 180,000, an Mw/Mn ratio of 6.0, a Tg of about 50° C. and a Ti of 104° C.

The polymer liquid crystal was dissolved in THF and re-precipitated in a 1/1 mixed solvent of THF and methyl alcohol to extract a polymer liquid crystal having an Mw of about 200,000, an Mw/Mn ratio of 3.2, a Tg of about 52° C., and a Ti of 106° C. (designated polymer liquid crystal (13)).

In 3.0 g of MEk were dissolved 1.0 g of polymer liquid crystal (13) and 0.05 g of 4,4'-diphenylmethane diisocyanate as a polyfunctional isocyanate compound (crosslinking agent), and the solution was applied on an 100 µm thick aluminum-deposited PET film with a blade coater and dried to form a polymer liquid crystal layer having a thickness of about 5 µm. The polymer liquid crystal layer was crosslinked in an oven at 90° C. for 24 hours. A protective layer was formed thereon in the same manner as in Example 1 to prepare a recording medium.

COMPARATIVE EXAMPLE 6

The same mesogen monomer as used in Example 16 was radical polymerized and purified in the same manner as in Example 17. The resulting polymer liquid crystal had an Mw of about 140,000, an Mw/Mn ratio of 5.5, a Tg of about 52° C., and a Ti of 114° C. A recording medium was prepared in the same manner as in Example 16 using the above-prepared polymer liquid crystal.

COMPARATIVE EXAMPLE 7

The same monomers as used in Example 17 were copolymerized under the same conditions as in Example 17, except for changing the amount of the solvent to 5.0 ml, to obtain a polymer liquid crystal having formula (13). The resulting polymer liquid crystal had an Mw of about 220,000, an Mw/Mn ratio of 6.1, a Tg of about 50° C., and a Ti of 103° C. A recording medium was prepared in the same manner as in Example 17 using the above-prepared polymer liquid crystal.

Evaluation:

Recording was made on each of the recording media prepared in Examples 16 and 17 and Comparative Examples 7 and 8 using a thermal printer (8 dots/mm; ≦0.3 mJ/dot). The heat applied area turned transparent to form a silver image. The recording medium with the transparent image was allowed to stand in a thermostat at 50° C. for 24 hours. The reflective optical density of the image area was measured before and after standing with X-rite 968 to evaluate heat stability of the recorded image. The results obtained are shown in Table 5 below.

TABLE 5

| Example No. | Polymer Liquid Crystal | | Optical Density of Recorded Image | |
|---|---|---|---|---|
| | Mw (× 10⁴) | Mw/Mn | Initial | Preserved (50° C. × 24 hrs) |
| Example 16 | 12 | 1.4 | 1.80 | 1.79 |
| Example 17 | 20 | 3.2 | 1.70 | 1.69 |
| Comparative Example 6 | 14 | 5.5 | 1.80 | 1.05 |
| Comparative Example 7 | 22 | 6.1 | 1.70 | 0.95 |

The recording layer of Examples 16 and 17 undergoes substantially no change in optical density when preserved at 50° C. for 24 hours. When observed with the naked eye, the recorded image (silver image) showed no change from the initial stage. On the other hand, the recording layer of Comparative Examples 6 and 7 showed a considerable change in optical density when preserved. When observed with the naked eye, the image area got turbid, indicating a great reduction in contrast. Observation of the image area of the recording layer of Comparative Examples under a polarizing microscope revealed formation of minute domains having optical anisotropy (birefringence), lending conformation to the formation of glassy domains of liquid crystal phase. In Examples, such an optically anisotropic domain was not observed, proving that the image area remained in an isotropic glassy state.

It is apparent from these observations that a recording layer comprising a polymer liquid crystal having a narrow molecular weight distribution is capable of forming an image having greatly improved heat stability.

In one embodiment of the optical element and the optical recording device according to the present invention, a polymer liquid crystal composition having a stable and optically anisotropic multi-domain structure which is formed by crosslinking a composition essentially comprising a polymer liquid crystal is used as a recording layer. Therefore, the optical element and optical recording device of this embodiment are excellent in rapidness, stability, and reproducibility in conducting recording/display/erasure of information. The optical element of this embodiment is useful as an optical recording medium, a display medium, a light modulating element, or a reversible heat-sensitive recording medium.

In another embodiment of the optical element and the optical recording device according to the present invention, a polymer liquid crystal comprising a copolymer of at least a mesogen monomer unit and a non-mesogen monomer is crosslinked so that at least a liquid crystal component and a non-liquid crystal component form the respective phases to provide a stable multi-domain structure. The optical element and the optical recording device of this embodiment are therefore excellent in rapidness, stability, and reproducibility in conducting recording/display/erasure of information. The optical element of this embodiment is useful as an optical recording medium, a display medium, a light modulating element, or a reversible heat-sensitive recording medium.

According to the image formation method of the present invention, an image showing no light scattering properties is formed on an optical element comprising a light scattering polymer liquid crystal composition, and the composition is then crosslinked to make the image unerasable. Accordingly, the method makes it possible to obtain an optical element having both an unerasable image and an erasable image.

Further, the recording medium according to the present invention which uses a polymer liquid crystal having a specific narrow molecular weight distribution as a recording layer is excellent in sensitivity characteristics, display contrast and image preservability and is expected to find broader application.

While the invention has been described in detail and with reference to specific examples thereof, it will be apparent to one skilled in the art that various changes and modifications can be made therein without departing from the spirit and scope thereof.

What is claimed is:

1. An optical element comprising a polymer liquid crystal composition having a multi-domain structure comprising crosslinked domains, each of said domains comprising liquid crystal molecules oriented substantially in one direction to produce optical anisotropy, wherein said multi-domain structure has such a domain size distribution that the domain diameter at the maximum in the frequency distribution of domain diameter is not greater than 3 µm.

2. An optical element as claimed in claim 1, wherein said multi-domain structure has such a domain size distribution that a difference between the maximum domain diameter and the minimum domain diameter is not more than 5 µm.

3. An optical element as claimed in claim 1, wherein said polymer liquid crystal composition comprises a copolymer containing a reactive group.

4. An optical element as claimed in claim 1, wherein said crosslinking is carried out by reaction of a polyfunctional reactive compound selected from the group consisting of isocyanate compounds, epoxy compounds, melamine compounds, aldehyde compounds, amine compounds, and carboxyl compounds.

5. An optical element as claimed in claim 1, wherein said liquid crystal composition comprises a copolymer of a polymerizable mesogen compound and a polymerizable compound having a reactive group or an addition-polymer of an addition reactive mesogen compound and an addition reactive non-mesogen compound having a reactive group to a reactive polymer.

6. An optical element as claimed in claim 1, wherein said liquid crystal composition comprises a copolymer of polymerizable mesogen compound, a polymerizable non-mesogen compound having a reactive group and a polymerizable non-mesogen compound having no reactive group.

7. An optical element as claimed in claim 1, wherein said element comprises a substrate having thereon the crosslinked polymer liquid crystal composition and a protective layer thereon.

8. An optical element as claimed in claim 1, wherein said polymer liquid crystal has a weight average molecular weight to number average molecular weight ratio (Mw/Mn) of not more than 4.0.

9. An optical element as claimed in claim 1, wherein said optical element comprises a substrate and a layer which is formed by molding said polymer liquid crystal composition having a weight average molecular weight to number average molecular weight ratio (Mw/Mn) of not more than 4.0 and then crosslinking said polymer liquid crystal.

10. A process for producing an optical element comprising subjecting a polymer liquid crystal composition to heat treatment to control a domain size of a multi-domain structure and crosslinking said composition while retaining said multi-domain structure.

11. The process as claimed in claim 10, wherein said multi-domain structure has such a domain size distribution that the domain diameter at the maximum in the frequency distribution of domain diameter is not greater than 3 μm.

12. The process as claimed in claim 10, wherein said polymer liquid crystal composition comprises a copolymer containing a liquid crystal monomer and a non-liquid crystal monomer.

13. The process as claimed in claim 10, wherein said heat treatment is carried out at a temperature at which said polymer liquid crystal composition exhibits a liquid crystal phase.

14. The process as claimed in claim 10, wherein said crosslinking is carried out at a temperature not higher than the liquid phase-isotropic phase transition point of said polymer liquid crystal composition.

15. An optical element comprising a polymer liquid crystal composition, wherein said composition has previously formed thereon an erasable image and an unerasable image, wherein said unerasable image is formed by an image having no light scattering properties on at least a part of said optical element and then crosslinking said composition to make said image having no light scattering properties unerasable.

16. An optical element as claimed in claim 15, wherein said formation of an image having no light scattering properties is carried out by heating at least part of the optical element to a temperature not lower than the liquid phase-isotropic phase transition point of said composition followed by cooling to a temperature not higher than the glass transition point of said composition.

17. An optical element as claimed in claim 15, wherein said unerasable image has an optically isotropic stage.

18. An optical element as claimed in claim 15, wherein said polymer liquid crystal composition is a copolymer comprising at least a mesogen monomer unit and a non-mesogen monomer unit and said composition containing said polymer liquid crystal has a multi-domain structure.

19. An image formation method comprising forming an image having no light scattering properties on an optical element comprising a light scattering-polymer liquid crystal composition having a multi-domain structure comprising crosslinked domains, each of said domains comprising liquid crystal molecules oriented substantially in one direction to produce optical anisotropy, wherein said multi-domain structure has a domain size distribution that the domain diameter at the maximum in the frequency distribution of domain diameter is not greater than 3 microns and then crosslinking said composition to make said image having no light scattering properties unerasable.

20. The process of claim 19, wherein said crosslinking is carried out at a temperature not higher than the liquid phase-isotropic phase transition point of said polymer liquid crystal composition.

21. An image formation method comprising forming an erasable image and an unerasable image on an optical element comprising a light scattering-polymer liquid crystal composition, wherein said unerasable image is formed by an image having no light scattering properties and crosslinking said composition to make said image having no light scattering properties unerasable.

* * * * *